United States Patent
Fornatora et al.

(10) Patent No.: US 7,320,729 B2
(45) Date of Patent: Jan. 22, 2008

(54) WATER RESISTANT STUCCO PRODUCT

(76) Inventors: Amil Fornatora, 4718 E. Cactus Rd., Suite 178, Phoenix, AZ (US) 85032; Michael Lindner, 18617 N. 45th Pl., Phoenix, AZ (US) 85050

( * ) Notice: Subject to any disclaimer, the term of this patent is extended or adjusted under 35 U.S.C. 154(b) by 3 days.

(21) Appl. No.: 11/533,669

(22) Filed: Sep. 20, 2006

(65) Prior Publication Data

US 2007/0068424 A1    Mar. 29, 2007

Related U.S. Application Data

(60) Provisional application No. 60/721,140, filed on Sep. 26, 2005.

(51) Int. Cl.
 C04B 18/06 (2006.01)
 C04B 7/24 (2006.01)
 C04B 14/00 (2006.01)
 C04B 14/10 (2006.01)
 C04B 14/42 (2006.01)
 C04B 28/22 (2006.01)

(52) U.S. Cl. .................... 106/706; 106/705; 106/708; 106/709; 106/710; 106/711; 106/716

(58) Field of Classification Search .............. 106/705, 106/706, 708, 709, 710, 711, 716
See application file for complete search history.

(56) References Cited

U.S. PATENT DOCUMENTS

| | | | |
|---|---|---|---|
| 2,681,863 A | 6/1954 | Croce et al. | |
| 3,616,173 A | 10/1971 | Green et al. | |
| 4,088,804 A | 5/1978 | Cornwell | |
| 4,346,050 A | 8/1982 | Trent et al. | |
| 4,689,358 A | 8/1987 | Schorr et al. | |
| 4,741,777 A * | 5/1988 | Williams et al. | 524/5 |
| 5,308,397 A * | 5/1994 | Whatcott | 106/711 |
| 5,482,737 A | 1/1996 | Gaveske | |
| 5,575,841 A | 11/1996 | Dry | |
| 5,576,065 A | 11/1996 | Gaveske | |
| 5,624,714 A | 4/1997 | Gaveske | |
| 5,634,307 A | 6/1997 | Larriberot et al. | |
| 6,299,679 B1 * | 10/2001 | Montoya | 106/730 |
| 6,869,474 B2 | 3/2005 | Perez-Pena et al. | |
| 2005/0092209 A1 | 5/2005 | Garner | |
| 2005/0092210 A1 | 5/2005 | Radtke | |

FOREIGN PATENT DOCUMENTS

JP    53-74524 A    *    7/1978

* cited by examiner

*Primary Examiner*—Anthony J. Green
(74) *Attorney, Agent, or Firm*—Venable, Campillo, Logan & Meaney, P.C.

(57) ABSTRACT

A water and flame resistant dry mix stucco is disclosed. The dry mix stucco includes water and flame resistant materials as an integral part of the mixture. The dry mix stucco is combined with water and applied to structures.

16 Claims, No Drawings

WATER RESISTANT STUCCO PRODUCT

This application claims the benefit of U.S. Provisional Application No. 60/721,140, filed Sep. 26, 2005, the disclosure of which is incorporated herein by reference.

FIELD OF THE INVENTION

The present invention relates generally to stucco products and, more particularly, to a pre-blended dry mix stucco product that, when mixed with water, becomes water resistant and flame resistant and shows increased strength.

BACKGROUND OF THE INVENTION

The use of stucco as a construction material is well known in the prior art. Specifically, stucco has been used as an exterior coating for buildings for many years because it is durable and withstands the elements. Stucco is usually made of portland cement, sand, and a small percentage of lime and is applied in a plastic state to form a hard covering for exterior walls.

Stucco is a cementitious material and is relatively porous. As a result, water is able to permeate the stucco and cause damage. Potential freezing and thawing of the water along with the accompanying expansion and contraction will form cracks in the stucco that weakens the overall structure. Additionally, any water that permeates the stucco can cause damage to the frame of the structure that the stucco is protecting.

It is also desirable that the stucco product be able to withstand heat and fire. Because stucco is used primarily on buildings, it is important that the stucco protect the structure by upholding against fire.

Various techniques have been disclosed in U.S. Pat. No. 6,869,474 (Perez-Pena et al.), U.S. Pat. No. 5,634,307 (Larriberot et al.), U.S. Pat. No. 5,624,714 (Gaveske), U.S. Pat. No. 5,576,065 (Gaveske), U.S. Pat. No. 5,575,841 (Dry), U.S. Pat. No. 5,482,737 (Gaveske), U.S. Pat. No. 4,689,358 (Schorr et al.), U.S. Pat. No. 4,346,050 (Trent), U.S. Pat. No. 4,088,804 (Cornwell), U.S. Pat. No. 3,616,173 (Green et al.), U.S. Pat. No. 2,681,863 (Croce et al.), and U.S. patent application Ser. Nos. 20050092210 (Radtke, Jr.) and 20050092209 (Garner) to overcome the problems with water permeating cementitous materials and protecting structures from flames. However, each of these disclosures suffers from one or more of the following disadvantages. First, these patents/patent applications do not describe cementitous materials that are both water resistant and flame resistant. Each material either exhibits some water resistant properties or some flame resistant properties but not both. Second, most of these patents/patent applications describe coatings that reduce water permeation. However, the coatings described require a time-consuming additional step when installing stucco and are expensive. Third, the coatings do not provide the same effectiveness received by using a material where the water resistant properties are an integral part of the material. When the water resistant and flame resistant materials are an integral part of the cementitous material, the cementitous material can better withstand water permeation and fire.

SUMMARY OF THE INVENTION

The present invention is directed to a material that satisfies the needs of providing a cementitous stucco material that is water resistant and fire resistant.

A water resistant stucco product of the present invention comprises a stucco dry mix that is water resistant and fire resistant and comprises ASTM C144 plaster sand, Type II portland cement, type S or SA lime, aluminum tri-hydrate, Class F fly ash, clay that further consists of $SiO_2$, $Al_2O_3$, MgO, $Fe_2O_3$, CaO, $K_2O$, and $Na_2O$, silica sand cement, chopped glass fibers, polypropylene fibers, and an olefin-sulfonate.

It is an object of the present invention to provide a stucco material that is water resistant.

It is a further object of the present invention to provide a stucco material that is flame resistant.

It is a further object of the present invention to provide a stucco material that has increased strength of 10-12%.

It is a further object of the present invention to provide a stucco material that has reduced surface pH.

The novel features that are considered characteristic of the invention are set forth with particularity in the appended claims. The invention itself however, both as to its structure and its operation together with the additional object and advantages thereof will best be understood from the following description of the preferred embodiment of the water resistant stucco product. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6 are sought to be invoked to define the invention(s), the claims will specifically state the phrases "means for" or "step for" and a function, without also reciting in such phrases any structure, material, or act in support of the function.

Moreover, even if the provisions of 35 U.S.C. §112, paragraph 6 are invoked to define the inventions, it is intended that the inventions not be limited only to the specific structure, material or acts that are described in the preferred embodiments, but in addition, include any and all structures, materials or acts that perform the claimed function, along with any and all known or later developed equivalent structures, materials, or acts for performing the claimed function.

DESCRIPTION OF PREFERRED EMBODIMENTS

The following discloses the specific components that are combined to produce the preferred embodiment of the dry mix stucco. Each component is identified by the generic name of the product or by a well known trade name with the basic chemical formula (if available) for each component. The component name is used for ease and clarity of description. Although specific trade names and/or product names have been disclosed, the invention is not limited to those products, but should include any product that can be substituted for any of the recited component products. The preferred embodiment of the dry mix stucco product comprises:

1. ASTM C144 plaster sand
2. Type II portland cement

3. Type S or SA lime $(Ca(OH)_2*Mg(OH)_2)$—double hydrated dolomitic lime. Type S lime has a fine particle size distribution and high surface area.
4. Aluminum tri-hydrate $(Al(OH)_3)$—the largest volume flame retardant used in the world. When aluminum tri-hydrate is heated to at least 200° C. it decomposes into 66% alumina and 34% water making it an effective flame retardant.
5. Class F fly ash is a pozzolan that is mostly silica, alumina, iron, and calcium. Class F fly ash greatly reduces the risk of expansion due to sulfate attack.
6. IMV 1016 Clay $(SiO_2, Al_2O_3, MgO, Fe_2O_3, CaO, K_2O,$ and $Na_2O)$—a low grit gelling clay produced from saponite. It has a trioctahedral structure and a flat tubular mica-like crystal with a fuzzy edge. It is a swelling clay having a low cation exchange capacity and imparts thixotropy to aqueous solutions.
7. Xypex C-1000 (silica sand cement) consists of portland cement, very fine treated silica sand and various active and proprietary chemicals including alkaline earth compounds. The active chemicals react with the moisture in fresh stucco and with the by-products of cement hydration to cause a catalytic reaction that generates a non-soluble crystalline formation through the pores and capillary tracts of the stucco.
8. Chopped glass fibers are added to cement to increase the strength of the resulting material.
9. Polypropylene fibers reduce the cracking in stucco caused by drying shrinkage.
10. Hostapur OSB ($C_{16}$-alpha-olefin sulfonate) is an air-entrainment additive. An air-entrainment additive such as Hostapur OSB helps incorporate many small air bubbles into the stucco to become part of the matrix that binds the aggregate together in the hardened stucco. Air-entrained stucco has increased freeze-thaw durability and is more workable than non-entrained stucco.

In the preferred embodiment of the invention, the above described components are combined to form a dry mix stucco product that is water resistant and exhibits flame resistant properties. The dry mix stucco is pre-blended and requires no additives other than clean water. When blended with water, it cures to a water resistant barrier within 12-14 days.

The preferred embodiment of the dry mix stucco product includes 75% by weight ATSM C-144 plaster sand, 15-17% by weight Type II cement, 2% by weight lime type S or SA, 1% by weight aluminum tri-hydrate, 3-5% by weight fly ash Class F, 0.54% by weight IMV 1016 clay, 0.01% by weight Hostapur OSB, 0.3-1.5% by weight Xypex, 0.2% by weight ½" chopped glass fibers, and 0.05% by weight polypropylene fibers. Additionally, comparable products can be substituted for any of the above ingredients. When these components are combined, they form a dry mix stucco product that exhibits enhanced compressive and impact strength, reduced surface pH for earlier coating application, water resistance, and fire resistance. The above formulation describes the typical composition of the water resistant stucco. However, it can be modified in accordance with specific applications by those skilled in the art.

Because stucco is relatively porous, water is able to permeate the material. Water permeation of stucco can cause various problems to the stucco itself and to the structure underlying the stucco. In the preferred embodiment of this invention, the increased water resistant properties of the dry mix stucco come from the addition of the Xypex additive. The Xypex additive is comprised of portland cement, very fine treated silica sand and various active and proprietary chemicals including alkaline earth compounds. The active chemicals react with the moisture in the fresh stucco and with the by-products of cement hydration to cause a catalytic reaction that generates a non-soluble crystalline formation through the pores and capillary tracts of the stucco. Xypex additive is preferred because it forms crystals in the stucco that allow water vapor to escape, but which prevent liquid water from entering the stucco matrix.

Flame resistance is also an important property for the dry mix stucco because stucco is used as an exterior coating for structures. In the preferred embodiment of the present invention, aluminum tri-hydrate is combined into the dry stucco mix to increase the fire resistant properties. When heated to 200° C., aluminum tri-hydrate decomposes into 66% alumina and 34% water. This irreversible process is what makes aluminum tri-hydrate an effective flame retardant.

Shown below in Table 1 are the key physical properties of the dry mix stucco. These physical properties are a direct result of the specific combination of ingredients in the dry mix stucco product.

TABLE 1

Key Physical Properties of Dry Mix Stucco

| | |
|---|---|
| Highly Crack Resistant | |
| Water Resistant | <25% water absorption v. standard stucco |
| Compressive Strength | >3000 psi at 28 days |
| Impact Resistant | >2200 $J/m^2$ to cause damage |
| Lower Surface pH | pH reduced much quicker than standard stucco |
| Shrinkage | 0.07% after 28 days |
| Vapor Permeability | Water vapor permeable. Does not create a vapor retarding barrier. |
| Noncombustible | ASTM E 136 |
| Water Retention | 94% ASTM C 91 |
| Wet Density | 100-110 $lbs/ft^2$ |

In addition to the above disclosed key physical properties, Tables 2-6 include data showing enhanced compressive strength, reduced surface pH, impact testing, enhanced water resistance, and average rate of water migration as compared to standard stucco (i.e. without the water resistant and flame resistant materials).

TABLE 2

Compressive Strength Testing at 14 and 28 days

| | 14 day Cube Break (lbs) | 14 day Comp. Strength (psi) | 28 day Cube Break (lbs) | 28 day Comp. Strength (psi) |
|---|---|---|---|---|
| Final Formula Cube Set A | 11136.0 | 2784.0 | +12000.0 | +3000.0 |
| Final Formula Cube Set B | 11204.0 | 2801.0 | +12000.0 | +3000.0 |
| Final Formula Cube Set C | 11262.0 | 2813.0 | +12000.0 | +3000.0 |

TABLE 3

Surface pH Testing

| | 3 days | 7 days | 14 days | 28 days |
|---|---|---|---|---|
| Standard Stucco | 13.82 s.u. | 13.61 s.u. | 13.47 s.u. | 13.22 s.u. |
| Water Resistant Stucco | 13.79 s.u. | 13.62 s.u. | 13.28 s.u. | 12.87 s.u. |

TABLE 4

Impact Testing 14 and 28 days

| | 14 day Impact for Standard Stucco | 14 day Impact for Final Formulation | 28 day Impact for Standard Stucco | 28 day Impact for Final Formulation |
|---|---|---|---|---|
| Mass of Impacter | 320 g | 320 g | 400 g | 400 g |
| Height of Freefall | 2.0 meters | 2.25 meters | 2.0 meters | 2.25 meters |
| Impact Energy J/m$^2$ | 1569 | 1765 | 1961 | 2206 |
| Results | Cracked Surface and Indented | Surface Cracks Only | Cracked Surface and Indented | Surface Cracks Only |

TABLE 5

Water Resistance Testing at 28 days (4" thick samples of water resistant stucco and standard stucco)

| Time Mins (Hours) | Standard Stucco Column Height (inches) | Final Formula Column Height (inches) |
|---|---|---|
| 0 (0.0) | 0.000 | 0.000 |
| 90 (1.5) | 0.250 | 0.050 |
| 180 (3) | 0.500 | 0.125 |
| 300 (5) | 0.900 | 0.275 |
| 480 (8) | 1.400 | 0.375 |
| 600 (10) | 1.750 | 0.475 |
| 720 (12) | 2.150 | 0.575 |

TABLE 6

Average Rate of Water Migration: Milliliters/Hour/cm$^2$

| | Standard Stucco | Water Resistant Stucco |
|---|---|---|
| Total Loss (ml) | 68.628 | 18.354 |
| Migration Rate | 5.719 | 1.529 |

Before applying the water resistant dry stucco mix to an exterior wall, it must be mixed with water. In the preferred embodiment, 1.8 gallons of water is mixed with 90 lbs. of dry stucco mix. First, approximately 90% of the water is added to the mixer. Next, the water resistant dry mix stucco is added. When the mixture becomes homogenous, the remaining water is added. The combination of water and water resistant dry mix stucco is mixed on low speed for a minimum of three (3) minutes, until the mixture is smooth. It is important not to over mix the product. Specifically, never mix more than five (5) minutes. The water resistant stucco should be used immediately after mixing. No other additives of any kind should be added to the water resistant dry mix stucco and water combination. Any other additives would damage the enhanced properties of the water resistant dry mix stucco product.

When applying the water resistant stucco to an exterior wall, a preferred application method is used. First, a weather resistant barrier is placed over all substrates. Preferably, the weather resistant barrier is Grade D kraft building paper complying with UBC Standard 14-1 or asphalt-saturated rag felt complying with UL Standard 55-A-1983. A foam core lathing material is then installed over the weather-resistive barrier and is attached to the framing. Preferably, minimum 1½ inch by No. 17 gage woven-wire fabric lath is then attached through the foam core using nails or staples. All fasteners must penetrate a minimum of 1 inch into the framing. The exterior water resistant stucco is then applied to a minimum ½ inch thickness. A minimum ⅛ inch thick finish coat of the water resistant stucco follows resulting in a minimum ⅝ inch overall thickness. The water resistant stucco then must cure for 48 hours after application.

The preferred embodiment of the invention is described in the Description of Preferred Embodiments. While these descriptions directly describe the one embodiment, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A water resistant stucco product comprising:
   a stucco dry mix wherein the stucco dry mix is water resistant and fire resistant and comprises:
   ASTM C144 plaster sand;
   Type II Portland cement;
   Type S/SA lime;
   aluminum tri-hydrate;
   Class F fly ash;
   clay wherein the clay consists of:
   $SiO_2$;
   $Al_2O_3$;
   MgO;
   $Fe_2O_3$;
   CaO;
   $K_2O$;
   $Na_2O$;

silica sand cement;
chopped glass fibers;
polypropylene fibers; and
an olefin-sulfonate.

2. The water resistant stucco product of claim 1 wherein:
the silica sand cement comprises:
alkaline earth compounds;
graded silica sand; and
calcium aluminates.

3. The water resistant stucco product of claim 1 wherein the olefin sulfonate is a $C_{16}$-alpha-olefin sulfonate.

4. The water resistant stucco product of claim 1 wherein the chopped glass fibers are ½ inch.

5. The water resistant stucco product of claim 1 wherein a quantity of water is added to the stucco dry mix such that a workable stucco is formed that cures to be water resistant and flame resistant.

6. The water resistant stucco product of claim 1 wherein the aluminum tri-hydrate acts as a flame retardant.

7. The water resistant stucco product of claim 1 wherein the silica sand cement acts to increase water resistance.

8. A method of making a water resistant stucco product comprising the steps of:
creating a stucco product that is water resistant and flame resistant by combining:
ASTM C144 plaster sand;
Type II Portland cement;
Type S/SA lime;
aluminum tri-hydrate;
Class F fly ash;
clay wherein the clay consists of:
$SiO_2$;
$Al_2O_3$;
MgO;
$Fe_2O_3$;
CaO;
$K_2O$;
$Na_2O$;
silica sand cement;
chopped glass fibers;
polypropylene fibers; and
an olefin sulfonate.

9. The method of claim 8 wherein:
the silica sand cement comprises:
alkaline earth compounds;
graded silica sand; and
calcium aluminates.

10. The method of claim 8 wherein the olefin sulfonate is a $C_{16}$-alpha-olefin sulfonate.

11. The method of claim 8 wherein the chopped glass fibers are ½ inch.

12. The method of claim 8 further comprising the step of adding a quantity of water to the stucco dry mix such that a workable stucco is formed that cures to be water resistant and flame resistant.

13. The method of claim 8 wherein the aluminum tri-hydrate acts as a flame retardant.

14. The method of claim 8 wherein the silica sand cement acts to increase water resistance.

15. A method for creating a workable stucco that cures to be water resistant and flame resistant comprising the steps of:
adding water to a mixer;
adding a dry mix stucco to the mixer to create a mixture of water and the dry mix stucco, wherein the dry mix stucco comprises:
ASTM C144 plaster sand;
Type II Portland cement;
Type S/SA lime;
aluminum tri-hydrate;
Class F fly ash;
clay wherein the clay consists of:
$SiO_2$;
$Al_2O_3$;
MgO;
$Fe_2O_3$;
CaO;
$K_2O$;
$Na_2O$;
silica sand cement;
chopped glass fibers;
polypropylene fibers; and
an olefin-sulfonate.
mixing until the mixture of water and dry mix stucco is smooth.

16. A method for creating a workable stucco that cures to be water resistant and flame resistant comprising the steps of:
adding a first amount of water to a mixer;
adding a dry mix stucco to the mixer to create a mixture of water and the dry mix stucco, wherein the dry mix stucco comprises:
ASTM C144 plaster sand;
Type II Portland cement; Type S/SA lime;
aluminum tri-hydrate;
Class F fly ash;
clay wherein the clay consists of:
$SiO_2$;
$Al_2O_3$;
MgO;
$Fe_2O_3$;
CaO;
$K_2O$;
$Na_2O$;
silica sand cement;
chopped glass fibers;
polypropylene fibers; and
an olefin sulfonate;
waiting until the mixture of dry mix stucco and the first amount of water becomes homogeneous;
adding a second amount of water to the mixer;
mixing until the mixture of the first amount of water, second amount of water, and dry mix stucco is smooth.

* * * * *